(12) United States Patent
Dvir et al.

(10) Patent No.: US 8,879,594 B2
(45) Date of Patent: Nov. 4, 2014

(54) EFFICIENT POWER CONTROL FOR AN AUTOMATIC LASER DRIVER

(71) Applicant: Broadcom Corporation, Irvine, CA (US)

(72) Inventors: Amiad Dvir, Nes Ziona (IL); Eli Elmoalem, Nili (IL); Assaf Koren, Netanya (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/841,421

(22) Filed: Mar. 15, 2013

(65) Prior Publication Data

US 2014/0119396 A1    May 1, 2014

Related U.S. Application Data

(60) Provisional application No. 61/721,417, filed on Nov. 1, 2012.

(51) Int. Cl.
*H01S 3/00* (2006.01)
*H04B 10/00* (2013.01)

(52) U.S. Cl.
CPC ............................. *H04B 10/00* (2013.01)
USPC ............... 372/38.02; 372/38.07; 372/38.1

(58) Field of Classification Search
USPC .................. 372/38.02, 38.07, 38.1
See application file for complete search history.

(56) References Cited

U.S. PATENT DOCUMENTS

| 8,306,014 | B1 * | 11/2012 | Vandwalle et al. | 370/350 |
| 2002/0064281 | A1 * | 5/2002 | Ishizaka | 380/201 |
| 2005/0041706 | A1 * | 2/2005 | Magoon | 372/38.02 |
| 2012/0045202 | A1 * | 2/2012 | Jiang et al. | 398/38 |

\* cited by examiner

*Primary Examiner* — Kinam Park
(74) *Attorney, Agent, or Firm* — Sterne, Kessler, Goldstein & Fox PLLC

(57) ABSTRACT

Systems and methods are provided to efficiently manage power in a laser a driver of an optical network unit (ONU) of a passive optical network (PON). Using information from an allocation map, the expected next allocated schedule for a transmission can be determined. The driver can be efficiently powered down and powered up based on the time remaining between the end of the current burst and the beginning of the next expected burst so that power is not wasted while the laser has no data to transmit.

20 Claims, 8 Drawing Sheets ized PONs (GPONs) and 10 G PONs
EFFICIENT POWER CONTROL FOR AN AUTOMATIC LASER DRIVER

CROSS REFERENCE TO RELATED APPLICATIONS

This application claims the benefit of U.S. Provisional Patent Application No. 61/721,417, filed on Nov. 1, 2012, which is incorporated by reference herein in its entirety.

FIELD OF THE INVENTION

This invention relates to lasers and more specifically to power control for laser drivers.

BACKGROUND

Lasers are used in a variety of applications to transmit data. For example, lasers can be used in passive optical networks (PONs), such as gigabit PONs (GPONs) and 10 G PONs (XGPONs). A PON is a point-to-multipoint network architecture comprising an optical line terminal (OLT) at the service provider and ONUs at subscribers for providing the subscribers broadband services. A laser can be implemented, for example, at each ONU at the subscriber station. A laser driver can also be implemented at each ONU to drive the laser with the data the laser transmits.

Lasers can transmit data in a variety of modes. For example, in burst mode, the laser driver modulates data so the laser transmits data repeatedly without waiting for input from another device or waiting for an internal process to terminate before continuing the transfer of data. Laser drivers are expected to transmit whatever data is on the transmit data pins while a burst enable signal is in the "transmit" state and not to transmit the content of the data on its data pins otherwise, and laser drivers generally expect a short period of time between burst "off" and "on" states. The data pins will always have a data signal (or other signal intended to maintain switching over the pins). Laser drivers are usually not assumed to know when the data on the data pins is not being used to transmit meaningful data. Because of the above considerations and because the deciphering of the transmission allocation map is part of the Media Access Control (MAC) functionality, the laser driver itself cannot accurately predict whether it has enough time to power down internal circuitry to save power when the laser driver is not transmitting data. Thus, the laser driver dissipates approximately the same amount of power regardless of whether the laser is transmitting meaningful data. This leads to inefficiencies in power usage.

Methods and systems are provided for implementing an efficient power control scheme in a laser driver so that power is conserved when the laser is not being used to transmit meaningful data.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1A:
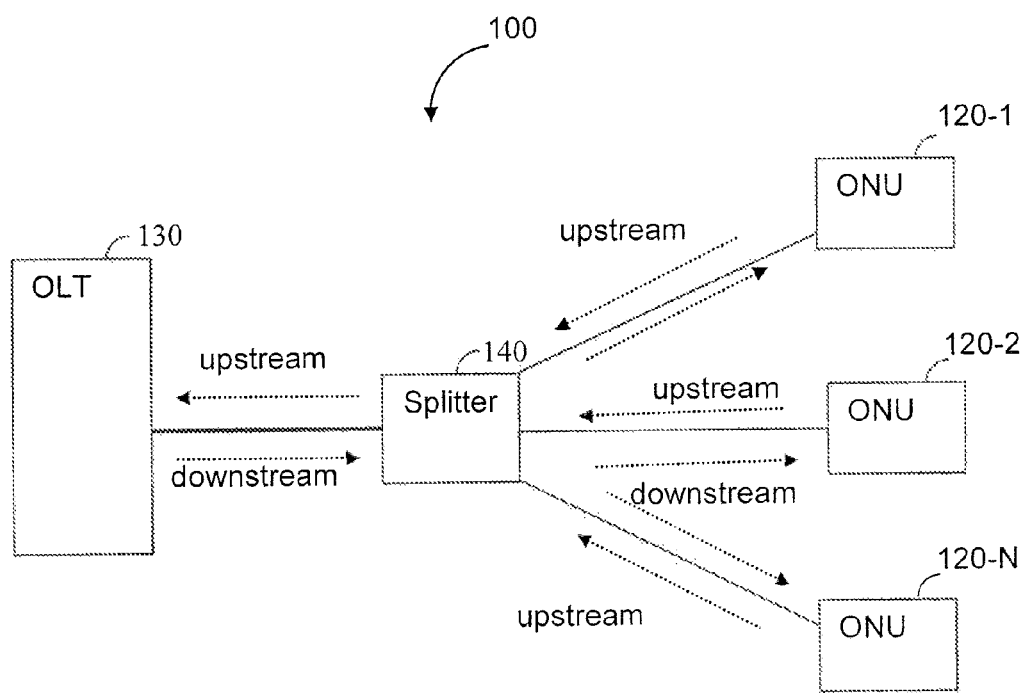
FIG. 1A is a schematic diagram of a passive optical network (PON).

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

A laser driver according to an embodiment of the present disclosure is configured to be powered down when the laser has no data to transmit. In an embodiment, the laser driver is implemented in an ONU of a PON, and a media access control (MAC) module of the laser driver is aware of the expected next allocated schedule for transmission based on an allocation map that is provided by an OLT of the PON. Using this allocation map, the laser driver can be instructed (e.g., by a controller or the MAC module) to wake up or power down. Using embodiments of the present disclosure, power can be saved without modifying the already standardized protocol of GPON and without the special modes of XGPON.

2. Passive Optical Network Topology

In an embodiment, a laser driver in accordance with embodiments of the present disclosure can be implemented in an optical network unit (ONU) of a passive optical network (PON). PON topology will now be described with reference to FIGS. 1 and 2.

A PON is a point-to-multipoint network architecture comprising an optical line terminal (OLT) at the service provider and ONUs at subscribers for providing the subscribers with broadband services. New standards have been developed to define different types of PONs, each of which serves a different purpose. For example, the various PON types known in the related art include a Broadband PON (BPON), an Ethernet PON (EPON), ten Gigabit-Ethernet PON (10 G-EPON) a Gigabit PON (GPON), ten-Gigabit PON (XG-PON), and others.

An exemplary diagram of a typical PON 100 is schematically shown in FIG. 1. The PON 100 includes N ONUs 120-1 through 120-N (collectively referred to as ONUs 120) connected to an OLT 130 via a passive optical splitter 140 and the optical fiber. In a GPON, for example, traffic data transmission is achieved using a GPON encapsulation method (GEM) over two optical wavelengths, one for the downstream direction and another for the upstream direction. Thus, downstream transmission from OLT 130 is broadcast to all ONUs 120. Each ONU 120 filters its respective data according to pre-assigned labels (e.g., GEM port-IDs in a GPON). In an embodiment, splitter 140 is a 1 to N splitter (i.e., a splitter capable of distributing traffic between single OLT 130 and N ONUs 120).

In most PON architectures, the upstream transmission is shared between ONUs 120 in a time division multiple access (TDMA) based access scheme controlled by OLT 130. TDMA requires that OLT 130 first discovers the ONUs and measures their round-trip-time (RTT) before enabling coordinated access to the upstream link. With this aim, OLT 130, during a ranging state, tries to determine the range between the terminal units (i.e., ONUs 120) to find out at least the RTT between OLT 130 and each of ONUs 120. The RTT of each ONU 120 is necessary in order to coordinate a TDMA based access of all ONUs 120 to the shared upstream link. During a normal operation mode, the range between the OLT 130 to the ONUs 120 may change over time due to temperature changes on the fiber links (which results with varying signal propagation time on the fiber). Thus, OLT 130 continuously measures the RTT and adjusts the TDMA scheme for each ONU accordingly.

Figure 1B:
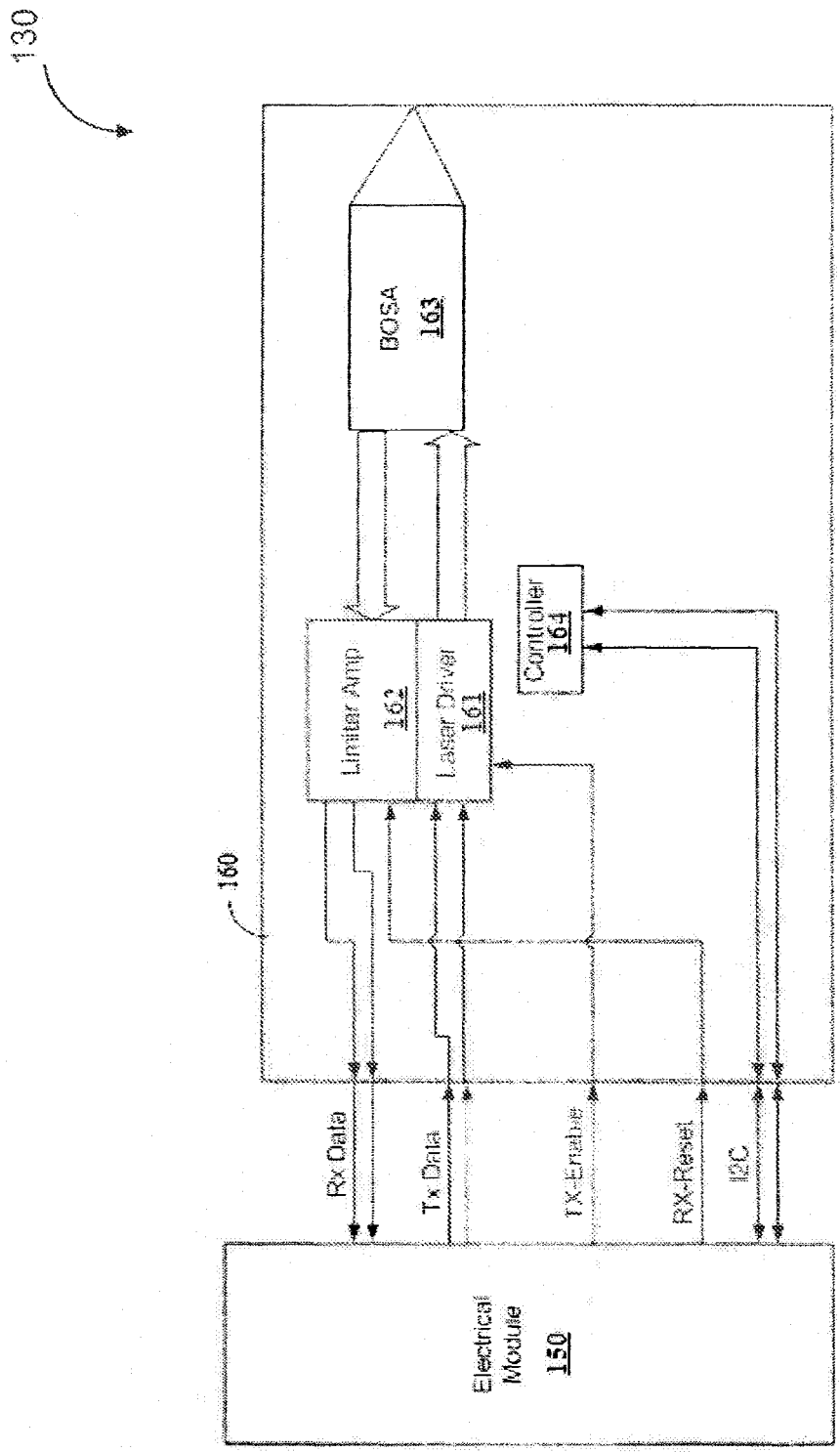
FIG. 1B is a block diagram of a conventional optical line terminal (OLT).

As schematically shown in FIG. 1B, OLT 130 (operable, for example, in a GPON or XG-PON) includes an electrical module 150 and an optical module 160. Electrical module 150 is responsible for the processing of received upstream burst signals and generating downstream signals. Electrical module 150 typically includes a network processor and a media access control (MAC) adapter designed to process and handle upstream and downstream signals according to a respective PON standard.

Optical module 160 in most cases is implemented as a small form-factor pluggable (SFP) transceiver that receives optical burst signals sent from ONUs (e.g., ONUs 120) and transmits continuous optical signals to the ONUs. The reception and transmission of signals is over two different wavelengths. For example, in a GPON, in the downstream direction, the optical module 160 generates an optical signal of 1480 nm to 1500 nm (as referred to 15XY), and, in the upstream direction, optical module 160 receives optical signals between 1260 nm and 1360 nm (also referred to as 13XY in GPON).

Optical module 160 includes a laser driver diode 161 coupled to a transmit laser diode that produces optical signals based on the electrical signals provided by laser diode driver 161. Optical module 160 also includes a limiter amplifier 162 coupled to a receive photodiode that produces current in proportion to the amount of light of the optical input burst signal. Limiter amplifier 162 generates two current levels indicating if a received burst signal is '1' or '0' logic value.

The receiver/transmitter optical elements (i.e., a photodiode and laser diode) are realized as a bidirectional optical sub-assembly (BoSa) module 163 that can transmit and receive high rate optical signals. Optical module 160 also includes a controller 164 that communicates with electrical module 150 through the I2C interface and performs tasks related to calibration and monitoring of the transceiver.

OLT vendors typically develop and fabricate electrical module 150 of OLT 130, where optical module 160 is often an off-the-shelve transceiver, such as SFP, XFP and the like. Thus, the interface between electrical module 150 and optical module 160 is a standard interface being compatible with any type of SFP transceiver. As illustrated in FIG. 1B, the interface includes wires for receive (RX) data, transmit (TX) data, TX-enabled signal, RX-Reset signal, and I2C for interfacing between electrical module 150 and controller 164. The I2C interface is a relatively slow serial interface with a data rate of up to 4 Mb/sec. In contrast, the RX data and TX data interfaces are high speed interfaces where the data rate of signals over these interfaces is as the data rate of the PON (e.g., 1 Gb/sec in a GPON).

Ethernet passive optical networks (EPONs) combine the Ethernet packet framework with PON technology. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 2A).

Figure 2A:
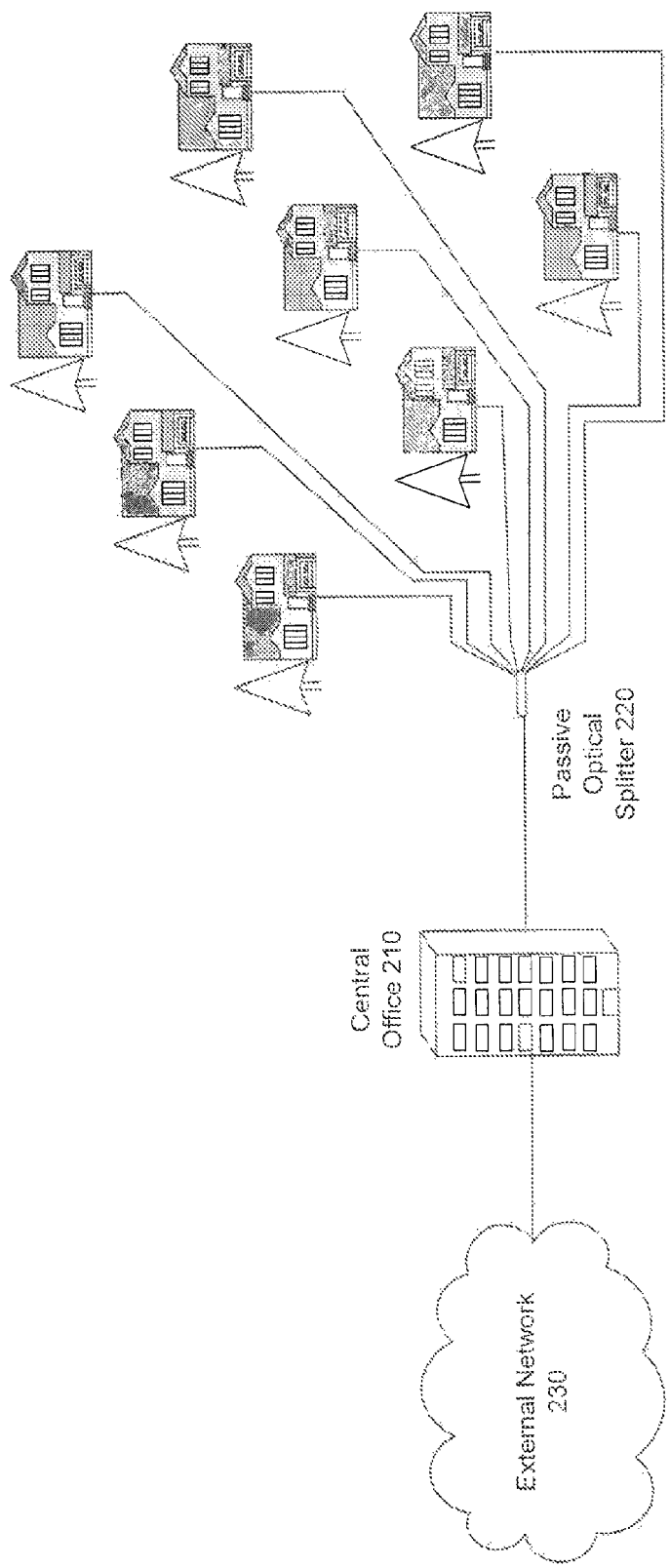
FIG. 2A illustrates an Ethernet passive optical network (EPON) wherein a central office and a number of subscribers are coupled together through optical fibers and a passive optical splitter.
Figure 2B:
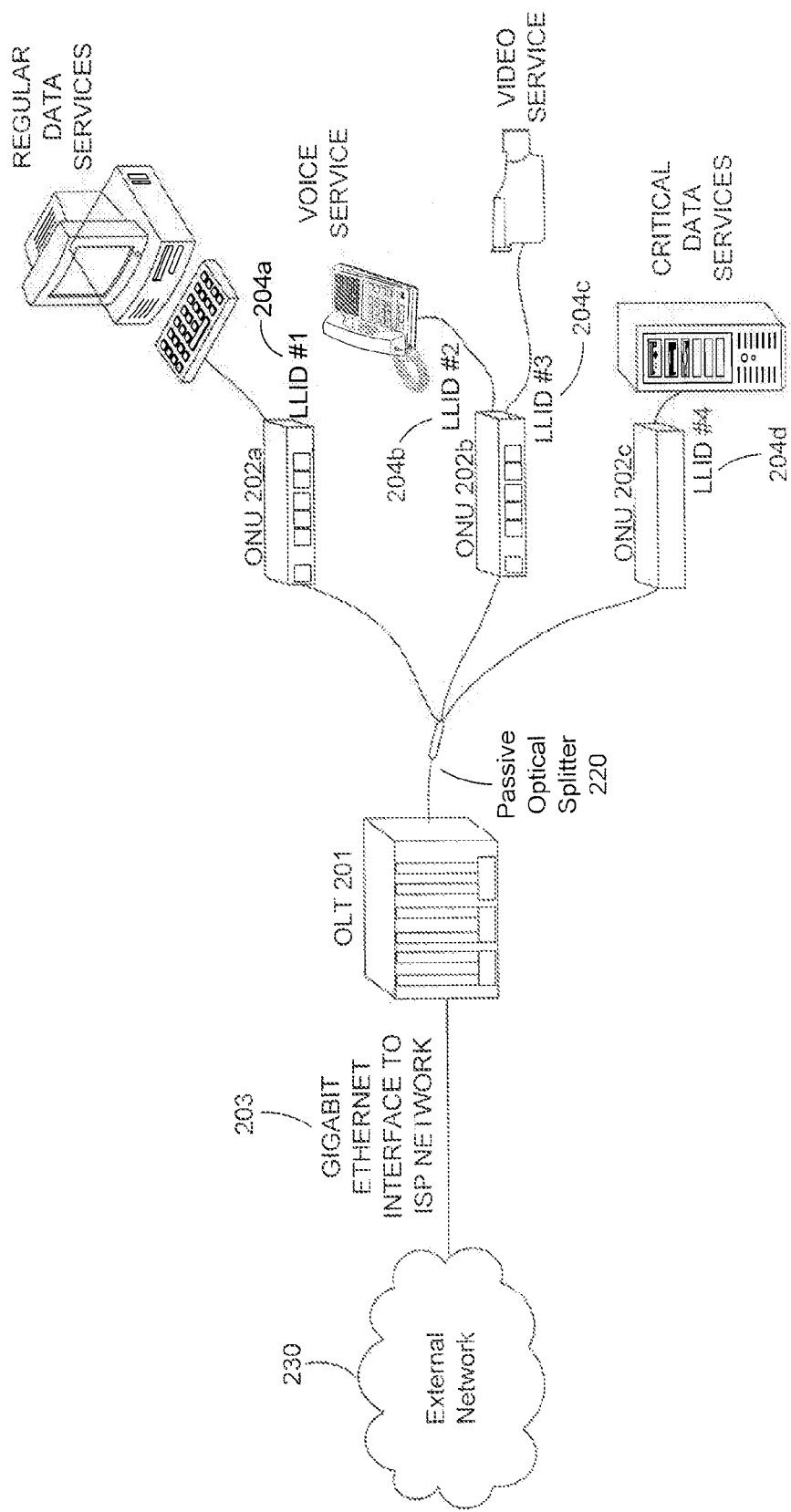
FIG. 2B illustrates a passive optical network including a single OLT and multiple ONUs.

Transmissions within an EPON are typically performed between an optical line terminal (OLT) and optical networks units (ONUs) (see FIG. 2B). The OLT generally resides in a central office (e.g., central office 210 in FIG. 2A) and couples the optical access network to the metro backbone, which is typically an external network belonging to an ISP or a local exchange carrier. The ONU can be located either at the curb or at an end-user location, and can provide broadband voice, data, and video services. ONUs are typically coupled to a one by N (1×N) passive optical coupler, where N is the number of ONUs, and the passive optical coupler is typically coupled to the OLT through a single optical link. This configuration can achieve significant savings in the number of fibers and amount of hardware required by EPONs.

Communications within an EPON can be divided into upstream traffic (from ONUs to OLT) and downstream traffic (from OLT to ONUs). In the upstream direction, the ONUs need to share channel capacity and resources, because there is only one link coupling the passive optical coupler with the OLT. In the downstream direction, because of the broadcast nature of the 1×N passive optical coupler, downstream data frames are broadcast by the OLT to all ONUs and are subsequently extracted by their destination ONUs based on their individual Logic Link Identifiers (LLIDs). An LLID carries physical address information for a frame and determines which ONU is allowed to extract the frame.

FIG. 2A illustrates a an Ethernet passive optical network (EPON), wherein a central office and a number of subscribers are coupled together through optical fibers and a passive optical splitter. As shown in FIG. 2A, a number of subscribers are coupled to a central office 210 through optical fibers and a passive optical splitter 220. Passive optical splitter 220 can be placed in the vicinity of end-user locations, so that the initial fiber deployment cost is minimized. Central office 210 can be coupled to an external network 230, such as a metropolitan area network operated by an Internet service provider (ISP). Note that although FIG. 2A illustrates a tree topology, an EPON can also be based on other topologies, such as a ring or a bus.

FIG. 2B illustrates an EPON including a single OLT and multiple ONUs. OLT 201 resides in a central office (e.g., central office 210 in FIG. 2A) and is coupled to external network 230 via interface 203. OLT 201 is coupled to ONUs 202 through optical fibers and passive optical splitter 220. As is illustrated in FIG. 2B, an ONU (e.g., any of ONUs 202) can accommodate a number of networked devices, such as personal computers, telephones, video equipment, network servers, etc. One or more networked devices belonging to the same class of service are typically assigned a Logical Link ID (LLID), as defined in the IEEE 802.3 standard. LLIDs 204 can represent, for example, a customer or a service for a customer, or they can be used for some other purpose. An LLID establishes a logical link between an ONU (e.g., any of ONUs 202) and OLT (e.g., OLT 201), which accommodates specific service level agreement (SLA) requirements. In this example, LLID #1 204a is assigned to regular data services for ONU 202a, LLID #2 204b is assigned to voice services for ONU 202b, LLID #3 204c is assigned to video services for ONU 202b, and LLID #4 204d is assigned to critical data services for ONU 202c.

3. System for Power Control of a Laser Driver

Figure 3:
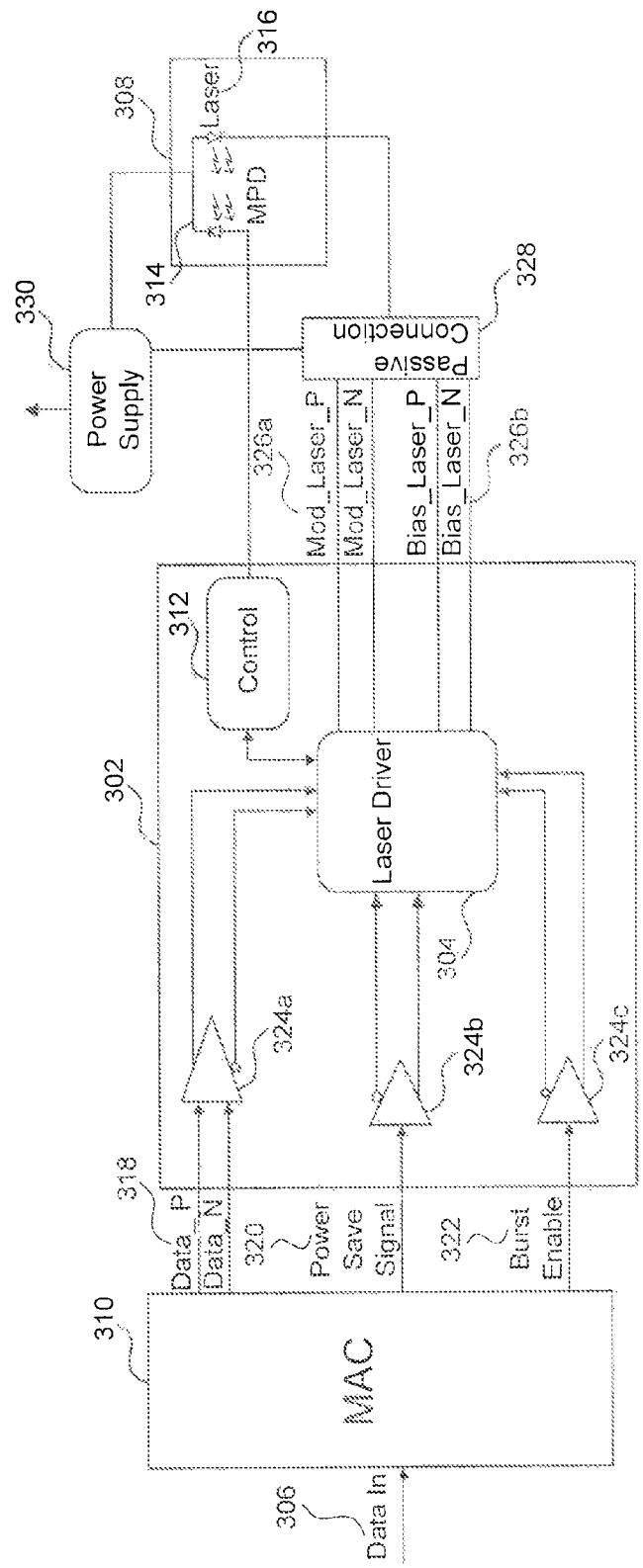
FIG. 3 is a block diagram of a system for power control of a laser driver in accordance with an embodiment of the present disclosure.

FIG. 3 is a block diagram of a system 300 for power control of a laser driver in accordance with an embodiment of the present disclosure. System 300 includes media access control (MAC) module 310, laser driver control module 302, laser module 308, and power supply 330. Laser driver control module 302 includes laser driver 304.

In an embodiment, laser driver system 300 is implemented in an ONU (e.g., ONU 120-1 or 202a) of a PON (e.g., a GPON, XGPON, or an EPON). In an embodiment, MAC module 310 is not part of laser driver module control module 302 but rather is implemented within the ONU (e.g., ONU 102-1 or 202a). MAC module 310 can receive a data input signal 306 from a user device and forward it to laser driver 304. Laser driver 304 drives laser 316 to transmit this data to a receiver (e.g., to OLT 130 or OLT 201) as an optical signal. Alternatively, in an embodiment, laser driver system 300 can be implemented in an OLT (e.g., OLT 130 or OLT 201) of a PON. When data is being transmitted in a downstream direction, MAC module 310 can receive data input signal 306 from external network 310 and forward it to laser driver 304. Laser driver 304 drives laser 316 to transmit data to a receiver (e.g., to ONU 120-1 or ONU 202a). When data is being transmitted in an upstream direction, MAC module 310 can receive data input signal 306 from an ONU (e.g., ONU 120-1 or ONU 202a) and forward it to laser driver 304. Laser driver 304 drives laser 316 to transmit data to a receiver (e.g., to external network 230).

MAC module 310 interfaces between the PON and laser driver module 302. For example, MAC module 310 receives data input signal 306 from a user device and forwards this data to laser driver module via data signals 318. MAC module 310 also transmits a burst enable signal 322 to laser driver control module 302, and laser 308 transmits data signals 318 as a burst of optical data. MAC module 310 also transmits a power save signal 320 to laser driver control module 302 to put laser driver module 302 in a power save state when laser driver control module 302 has no data to transmit.

Laser driver control module 302 can include buffers 324 that receive signals from MAC module 310 and forward them to laser driver 304. In an embodiment, laser driver control module 302 also includes a controller module 312 coupled between laser driver 304 and a monitor photo diode (MPD) 314 in laser module 308. MPD 314 can sense the average power of a signal transmitted by laser 316 and can provide this information to controller module 312. For example, in an embodiment, laser 316 and MPD 314 of laser module 308 are co-located or coupled in such a way that MPD 314 is exposed to a sufficient percentage of the optical power transmitted by laser 316 such that MPD 314 can generate a current based on this optical power. MPD 314 sends this current to controller module 312, which can use it to determine the average optical power transmitted by laser 308. Controller module 312 can use the current generated by MPD 314 to control the operation of laser driver 304. Laser driver control module 302 can control the bias current and the modulation current sent to laser 316 via bias current signals 326b and modulation current signals 326a, which are transmitted to laser 316 through passive connection 328.

4. Powering Down and Powering Up the Laser Driver

In an embodiment of the present disclosure, MAC module 310 is aware of the expected period of transmission of data because this information was sent to MAC module 310 by the OLT. MAC module 310 configures laser driver 304 to be powered down when laser driver 304 receives no data to transmit. For example, a user device can transmit an allocation map to the ONU implementing laser driver control system 300 (e.g., to ONU 120-1 or ONU 202a). This allocation map contains information containing a schedule of allocated transmissions. For example, in an embodiment, MAC module 310 can receive this allocation map via data input signal 306. Using the schedule, MAC module 310 can determine when to power down laser driver 304 and when to power up laser driver 304 so that power is conserved when laser driver 304 is not needed to transmit meaningful data. In an embodiment, MAC module 310 uses the schedule of allocated transmissions to generate and/or modify power save signal 320. For example, in an embodiment, MAC module 310 can analyze an expected future allocated transmission schedule and can devise a power schedule for powering laser driver 304 down and up based on when MAC module 310 determines that laser driver 304 will be needed to transmit data. Because MAC module 310 is aware of these expected future allocated transmissions, MAC module 310 can power laser driver 304 down and/or up without altering or ignoring received commands (e.g., received commands from OLT 130 or 201 or from a user device).

Laser driver 304 can be powered down or powered up in a relatively short amount of time (e.g., in <100 ns or any other pre-define period). MAC module 310 sends power save signal 320 to laser driver 304 so that laser driver 304 has sufficient time to wake up before laser driver 304 is needed to transmit data. In an embodiment, power save signal 320 can instruct laser driver 304 to be put in a sleep mode (e.g., in a low power mode). In another embodiment, power save signal 320 can instruct laser driver 304 to power down completely. For example, if MAC module 310 determines, based on the allocation map, that meaningful data (e.g., data other than dummy loads and/or link status data) will need to be transmitted soon (e.g., in approximately 100 ns), MAC module 310 sends power save signal 320 to laser driver 304 so that laser driver 304 has sufficient time to wake up so that it can transmit the data in a timely fashion.

In an embodiment, laser driver 304 has a power save control input. For example, the power save control input can be a power save control pin (not shown). MAC module 310 can send a signal to the power save control input to instruct laser driver 304 to wake up or to power down. In an embodiment, power save signal 320 sent by MAC module 310 to laser driver 304 has two states, "on" and "off." MAC module 310 can use power save signal 320 to control the power save control input according to the time remaining between end of current burst and the beginning of the next expected burst.

For example, the time required for laser driver 304 to power down from an "on" state to an "off" state when power save signal 320 is toggled to a power save "on" state can be represented by a predetermined value "XON." The time required for laser driver 304 to power up from an "off" state to an "on" state when power save signal 320 is toggled to a power save "off" state can be represented by a predetermined value "XOFF." In an embodiment, these XON and XOFF values may be determined based on individual characteristics of laser driver 304. Some laser drivers may power up and/or power down faster or slower than other laser drivers, depending on, for example, manufacturing characteristics of the laser driver. In an embodiment, XON and XOFF are values set during manufacture of laser driver control module 302 and/or MAC module 310. In an embodiment, XON and XOFF can also be changed (e.g., by a user) after manufacture of laser driver control module 302 and/or MAC module 310. XON and XOFF are further illustrated and explained in the timing diagrams of FIGS. 5A and 5B, which are discussed in greater detail later.

If the power save signal state is currently set to "on" (e.g., if laser driver 304 is currently conserving power) and if the time remaining to the next allocated transmission is less than or equal to XOFF+XON (e.g., if laser driver 304 will not have sufficient time to power up and power back down again before transmitting data), MAC module 310 changes the power save signal 320 state to "off" so that laser driver 304 is no longer in a power conservation state. By changing the power save signal 320 state to "off," MAC module 310 ensures that laser driver 304 has enough time to power up from an "off" state to an "on" state (e.g., represented by XOFF) before transmitting a burst of data. After laser driver 304 is powered up, MAC module 310 toggles burst enable signal 322 to an "on" state, and laser driver 304 can be used to transmit a burst of data.

If the power save signal state is currently set to "off" (e.g., if laser driver 304 is not currently conserving power) and if the time remaining to the next allocated transmission is greater than XOFF+XON (e.g., if laser driver 304 will have sufficient time to power up and power back down again before transmitting data), MAC module 310 changes the power save signal state to "on" so that laser driver 304 is put in a power conservation state. By changing the power save signal 320 state to "on," MAC module 310 ensures that laser driver 304 conserves power while not transmitting a burst of data. It should be understood that, in an embodiment, MAC module 310 does not change the power save signal state from an "off" state to an "on" state while laser driver 304 is current being used to transmit data. It should further be understood that, in an embodiment, MAC module 310 does not change the power save signal state from an "off" state to an "on" state while MAC module 310 is transmitting burst enable signal 322. In an embodiment, after MAC 310 sets burst enable signal 322 to an "off" state, MAC module 310 can then change the state of power save signal 320 from "off" to "on."

In an embodiment, link status data is continuously transmitted to a receiver at a certain rate so that the receiver can determine that the link is still active. In an embodiment, MAC module 310 can instruct laser driver 304 to be powered up to transmit this link status data on schedule so that a receiver does not determine that the link between laser 308 and the receiver has failed. Laser driver 304 can then be powered down until laser driver 304 is needed to transmit new link status data or meaningful (e.g., data other than link status data). For example, in an embodiment, a certain number of packets can be "dropped" without causing a receiver to determine that the link had failed, and laser driver 304 can be powered down so that the minimum necessary amount of link status data is transmitted to the receiver so that power savings is maximized.

The effect of the power savings scheme discussed above can be very significant. For example, if the average power dissipation in a transmission state of laser driver 304 is 400 mW, and the transmission rate of meaningful data packets over time is only 1/64, this power savings scheme can reduce the average power dissipated by laser driver 304 to 6.25 mW/h. Further, a laser driver system implemented according to embodiments of the present disclosure can advantageously save power without disrupting link connectivity by continuing to transmit link status information on schedule.

While MAC module 310 determines when to instruct laser driver 304 to be powered down or powered up in embodiments of the present disclosure discussed above, it should be understood that, in an embodiment, other logic (e.g., a controller, such as controller module 312 or another controller) can receive information from MAC module 310 and determine when to instruct laser driver 304 to be powered down or powered up. It should also be understood that elements of laser driver system 300 can be implemented on one or more integrated circuits (e.g., chips). For example, in an embodiment, MAC module 310, laser driver control module 302, and laser module 308 are all implemented on a shared integrated circuit. For further example, in an embodiment, MAC module 310 and laser driver module 302 are implemented on a shared integrated circuit, and laser module 308 is implemented on a separate integrated circuit. In another example, MAC module 310, laser driver module 302, and laser module 308 are implemented on separate integrated circuits.

5. Laser Driver Control Methods

Figure 4:
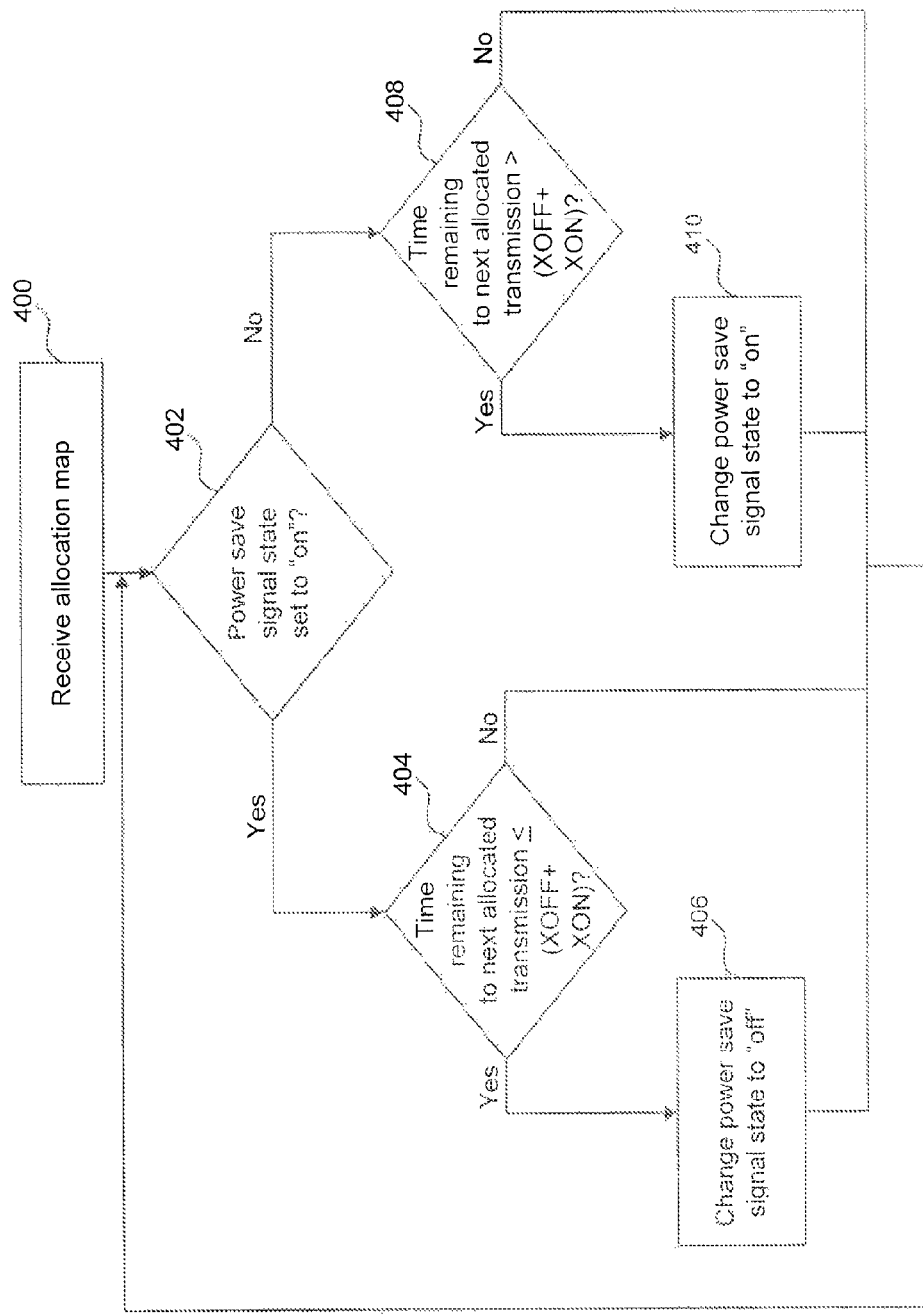
FIG. 4 is a flowchart of a method for power control of a laser driver in accordance with an embodiment of the present disclosure.

FIG. 4 is a flowchart of a method for power control of a laser driver in accordance with an embodiment of the present disclosure. In step 400, an allocation map is received (e.g., from a user device). In an embodiment, the allocation map contains a schedule of upcoming transmissions of data. In an embodiment, the user device continues to transmit new allocation maps to MAC module 310 as new allocation information is determined by the user device. In step 402, a determination is made (e.g., by MAC module 310) regarding whether the state of power save signal 320 is set to "on." If the power save signal state is set to "on," the method proceeds to step 404. If the power save signal state is not set to "on" (i.e., if it is set to "off"), the method proceeds to step 408.

At step 404, a determination is made regarding whether the time remaining to the next allocated transmission is less than or equal to (XOFF+XON). For example, MAC module 310 can make this determination based on information from the allocation map. If MAC module 310 determines that the time remaining to the next allocated transmission is less than or equal to (XOFF+XON), the power save signal state is toggled (e.g., by MAC module 310) to the "off" state at step 406, and the method returns to step 402. If MAC module 310 determines that the time remaining to the next allocated transmission is not less than or equal to (XOFF+XON), no change is made to the power save signal state, and the method returns to step 402.

At step 408, a determination is made regarding whether the time remaining to the next allocated transmission is greater than (XOFF+XON). For example, MAC module 310 can make this determination based on information from the allocation map. If MAC module 310 determines that the time remaining to the next allocated transmission is greater than (XOFF+XON), the power save signal is toggled (e.g., by MAC module 310) to the "on" state at step 410, and the method returns to step 402. If MAC module 310 determines that the time remaining to the next allocated transmission is not greater than (XOFF+XON), no change is made to the power save signal state, and the method returns to step 402.

6. Timing Diagrams

Figure 5A:
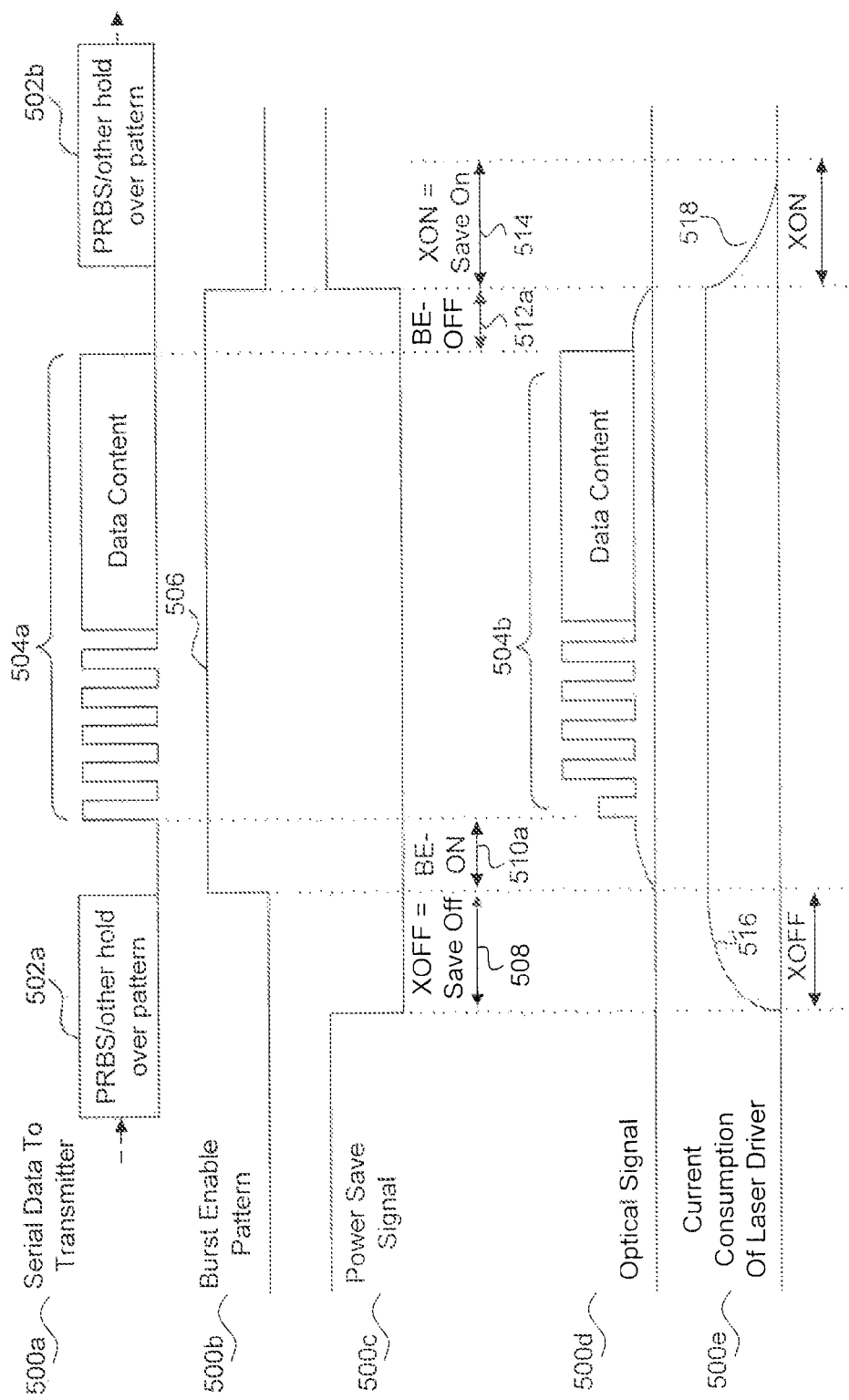
FIG. 5A is a timing diagram illustrating an embodiment of the present disclosure.

Timing diagrams illustrating embodiments of the present disclosure will now be described with reference to FIGS. 5A and 5B. It should be understood that the timing diagrams of FIGS. 5A and 5B may not be drawn exactly to scale. FIG. 5A shows five timing diagram signals. Serial data signal timing diagram 500a represents data signals 318 sent by laser driver 304 to laser 316. Burst enable pattern signal timing diagram 500b represents burst enable signal 322 sent by MAC module 310 to laser driver control module 302. Power save signal timing diagram 500c represents power save signal 320 sent by MAC module 310 to laser driver control module 302. Optical signal timing diagram 500d represents the optical data transmitted by laser 316 to a receiver. Current consumption signal timing diagram 500e represents the amount of current consumed by laser driver 304.

Serial data signal timing diagram 500a contains data content 504a and pseudo-random binary sequence (PRBS) data 502 (or other hold over data) where no data content is present in the signal. Using the allocation map, MAC module 310 can obtain a schedule of allocated transmissions and can determine the location of data content 504 in data input signal 306. Using this information, MAC module 310 sends burst enable signal 322 (represented in the timing diagram of FIG. 5A as burst enable pattern signal timing diagram 500b) to laser driver control module 302. Laser driver 304 modulates data content 504a, and laser 316 transmits a burst of optical data including data content 504b.

As shown by FIG. 5A, burst enable pattern signal timing diagram 500b shows burst enable signal 322 going high 506 while data content 504a is transmitted. In an embodiment, burst enable signal 322 is transmitted slightly before (e.g., as shown by BE-ON signal 510a) and slightly after (e.g., as shown by BE-OFF signal 512a) data content 504a to ensure that all data content 504a is properly transmitted.

As current consumption signal timing diagram 500e illustrates, laser driver 304 can require a certain amount of time 518 to power down from an "on" state to an "off" state (e.g., XON 514) when the state of power save signal 320 is changed to a power save "on" state from a power save "off" state. Additionally, laser driver 304 can require a certain amount of time 516 to power up from an "off" state to an "on" state when the state of power save signal 320 is changed to a power save "off" state from a power save "on" state. Thus, in an embodiment, MAC module 310 sets power save signal 320 to a power save "off" state early enough so that laser driver 304 has sufficient time to power up before it receives burst enable signal 322.

Figure 5B:
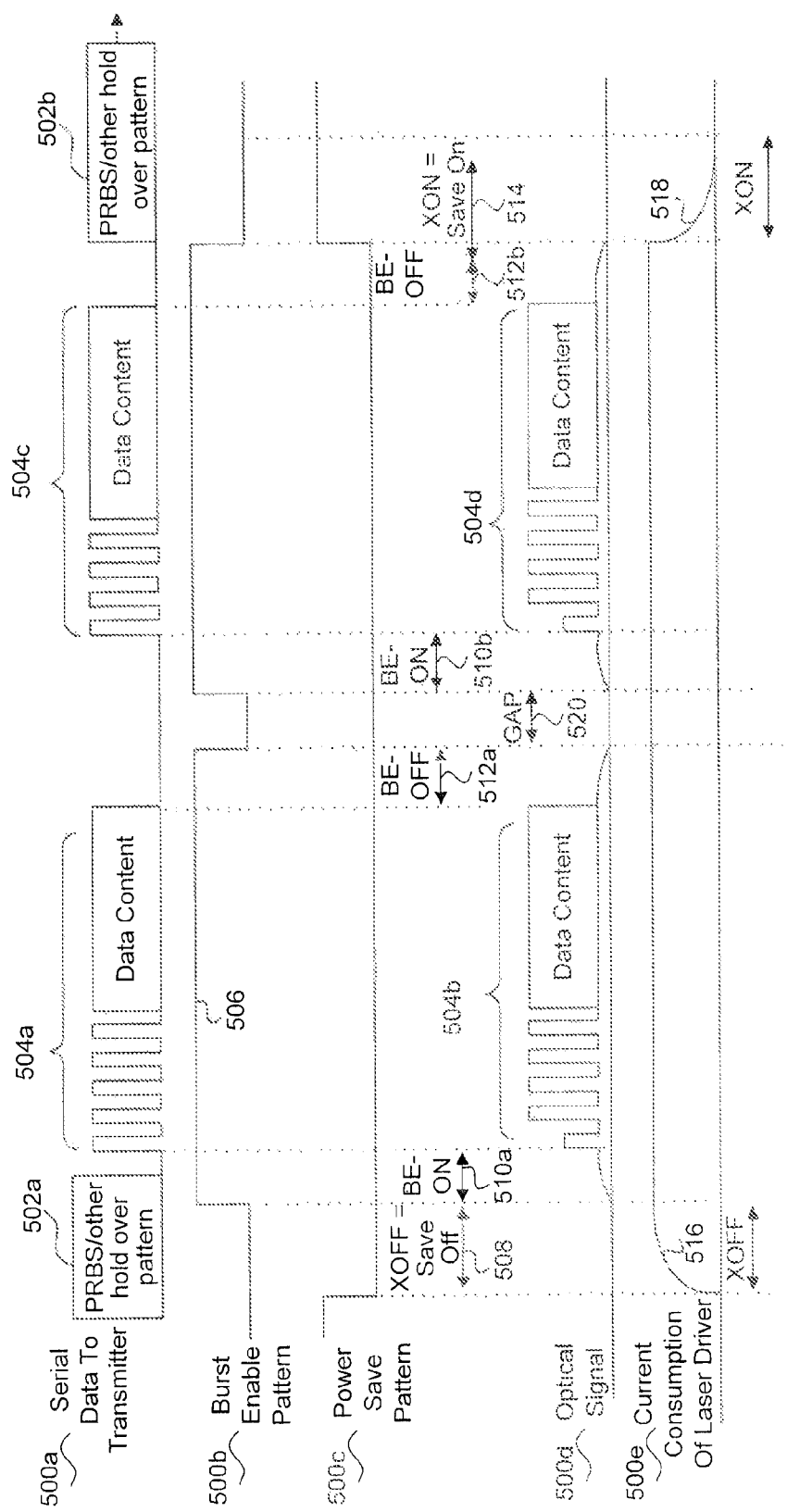
FIG. 5B is another timing diagram illustrating an embodiment of the present disclosure.

FIG. 5B shows a timing diagram illustrating how MAC module 310 determines the state of power save signal 320. In FIG. 5B, second data content 504d is scheduled to be transmitted as optical data content 504d by laser 316. Burst enable signal 322 is transmitted slightly before (e.g., as shown by BE-ON signal 510b) and slightly after (e.g., as shown by BE-OFF signal 512b) data content 504d to ensure that all data content 504a is properly transmitted.

As shown by FIG. 5B, there is occasionally a brief gap 520 between transmissions of data content (e.g., data content 504b and 504d). As illustrated by the flowchart of FIG. 4, if power save signal 320 is set to a power save "on" state, MAC module 310 changes it to a power save "off" state if the time to the next allocated transmission is less than or equal to (XON+XOFF). Likewise, if power save signal 320 is set to a power save "off" state, MAC module 310 changes it to a power save "on" state if the time to the next allocated transmission is greater than (XON+XOFF).

In FIG. 5B, power save pattern 500c indicates that power save signal 320 has been set to power save "off" when gap 520 is encountered. Gap 520 is less than or equal to XOFF 516+ XON 518. Thus, the state of power save signal 320 is not changed because MAC module 310 has insufficient time to power laser driver 304 down and power laser driver 304 back up again before data content 504d is scheduled to be transmitted.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The representative signal processing functions described herein can be implemented in hardware, software, or some combination thereof. For instance, the signal processing functions can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, and further the invention should be defined only in accordance with the following claims and their equivalents.

What is claimed is:

1. A laser driver system, comprising:
   a laser driver configured to drive a laser based on a received data input signal; and
   a media access control (MAC) module coupled to the laser driver, wherein the MAC module is configured to:
      receive an allocation map, and
      control, based on the allocation map, a power state of the laser driver.

2. The laser driver system of claim 1, further comprising:
   a laser driver control module coupled to the MAC module, wherein the laser driver control module includes the laser driver.

3. The laser driver system of claim 1, wherein the MAC module is further configured to:
   control the power state of the laser driver by transmitting a power save signal to the laser driver; and
   set the power save signal to a power save "on" state or a power save "off" state.

4. The laser driver system of claim 3, wherein the MAC module is further configured to:
   analyze, based on the allocation map, an expected future allocated transmission schedule; and
   determine, based on the expected future allocated transmission schedule, a laser driver power schedule to control the power state of the laser driver, wherein the laser driver power schedule contains information for setting the power save signal to the power save "on" state or the power save "off" state without altering or ignoring a received command.

5. The laser driver system of claim 3, wherein the MAC module is further configured to:
   determine, based on the allocation map, a first time required for the laser driver to power down from an "on" state to an "off" state and a second time required for the laser driver to power up from the "off" state to the "on" state;
   determine whether the laser driver is expected to transmit data within a predefined period of time;
   set the power save signal to the power save "on" state when the MAC module determines that the laser driver is not expected to transmit data within the predefined period of time; and
   set the power save signal to the power save "off" state when the MAC module determines that the laser driver is expected to transmit data within the predefined period of time.

6. The laser driver system of claim 1, wherein the allocation map contains a schedule of allocated transmissions, and wherein the MAC module is further configured to:
   toggle the power state of the laser driver to a first state in response to a first determination that a time remaining to a next allocated transmission is less than or equal to a sum of a first time required for the laser driver to power down from an "on" state to an "off" state and a second time required for the laser driver to power up from the "off" state to the "on" state; and
   toggle the power state of the laser driver to a second state in response to a second determination that the time remaining to the next allocated transmission is greater than the sum of the first time and the second time.

7. The laser driver system of claim 1, wherein the MAC module is further configured to:
   transmit a burst enable on signal to the laser driver after the laser driver has been powered up;
   transmit a data signal to the laser driver after transmitting the burst enable on signal; and
   transmit a burst enable off signal to the laser driver after transmitting the data signal.

8. The laser driver system of claim 1, wherein the MAC module is further configured to:
   maintain the power state of the laser driver in an "on" state in response to determining that a gap of time between a first transmission of data and a second transmission of data is less than or equal to a sum of a first time required for the laser driver to power down from the "on" state to an "off" state and a second time required for the laser driver to power up from the "off" state to the "on" state.

9. A laser driver system, comprising:
   a laser driver configured to drive a laser based on a received data input signal;
   a control module coupled to the laser driver, wherein the control module is configured to:
      instruct the laser driver to be powered down when the control module determines, based on received allocation information, that the laser driver is not expected to transmit data within a predefined period of time, and
      instruct the laser driver to wake up when the control module determines, based on the received allocation information, that the laser driver is expected to transmit data within the predefined period of time.

10. The laser driver system of claim 9, wherein the control module is further configured to:
    analyze an allocation map, wherein the allocation map contains the allocation information.

11. The laser driver system of claim 9, wherein the control module is further configured to instruct the laser driver to be powered down or to wake up by transmitting a power save signal to the laser driver.

12. The laser driver system of claim 11, wherein the control module is further configured to set the power save signal to a power save "on" state or a power save "off" state.

13. The laser driver system of claim 9, wherein the control module is further configured to:
instruct the laser driver to wake up in response to a first determination that a time remaining to a next allocated transmission is less than or equal to a sum of a first time required for the laser driver to power down from an "on" state to an "off" state and a second time required for the laser driver to power up from the "off" state to the "on" state; and
instruct the laser driver to be powered down in response to a second determination that the time remaining to the next allocated transmission is greater than the sum of the first time and the second time.

14. The laser driver system of claim 9, wherein the control module is further configured to:
transmit a burst enable on signal to the laser driver after the laser driver has been powered up;
transmit a data signal to the laser driver after transmitting the burst enable on signal; and
transmit a burst enable off signal to the laser driver after transmitting the data signal.

15. The laser driver system of claim 9, wherein the control module is further configured to:
maintain a power state of the laser driver in an "on" state in response to determining that a gap of time between a first transmission of data and a second transmission of data is less than or equal to a sum of a first time required for the laser driver to power down from the "on" state to an "off" state and a second time required for the laser driver to power up from the "off" state to the "on" state.

16. A method for power control of a laser driver, the method comprising:
determining whether a state of a power save control signal of a laser driver is set to a power save "on" state;
toggling the state of the power save control signal to a first state in response to a first determination that a time remaining to a next allocated transmission is less than or equal to a sum of a first time required for the laser driver to power down from an "on" state to an "off" state and a second time required for the laser driver to power up from the "off" state to the "on" state; and
toggling the state of the power save control signal to a second state in response to a second determination that the time remaining to the next allocated transmission is greater than the sum of the first time and the second time.

17. The method of claim 16, wherein a media access control (MAC) module is configured to toggle the state of the power save control signal.

18. The method of claim 16, further comprising:
receiving a schedule of allocated transmissions; and
analyzing the schedule of allocated transmissions to determine whether to toggle the state of the power save control signal.

19. The method of claim 18, further comprising:
transmitting a burst enable on signal to the laser driver after the laser driver has been powered up;
transmitting a data signal to the laser driver after transmitting the burst enable on signal; and
transmitting a burst enable off signal to the laser driver after transmitting the data signal.

20. The method of claim 16, further comprising:
maintaining the state of the power save control signal in the second state in response to determining that a gap of time between a first transmission of data and a second transmission of data is less than or equal to a sum of a first time required for the laser driver to power down from the "on" state to an "off" state and a second time required for the laser driver to power up from the "off" state to the "on" state.

* * * * *